Feb. 23, 1954  O. MUELLER  2,669,841
HYDRAULIC FLUID CONTROL PANEL
Filed April 10, 1950  4 Sheets-Sheet 1
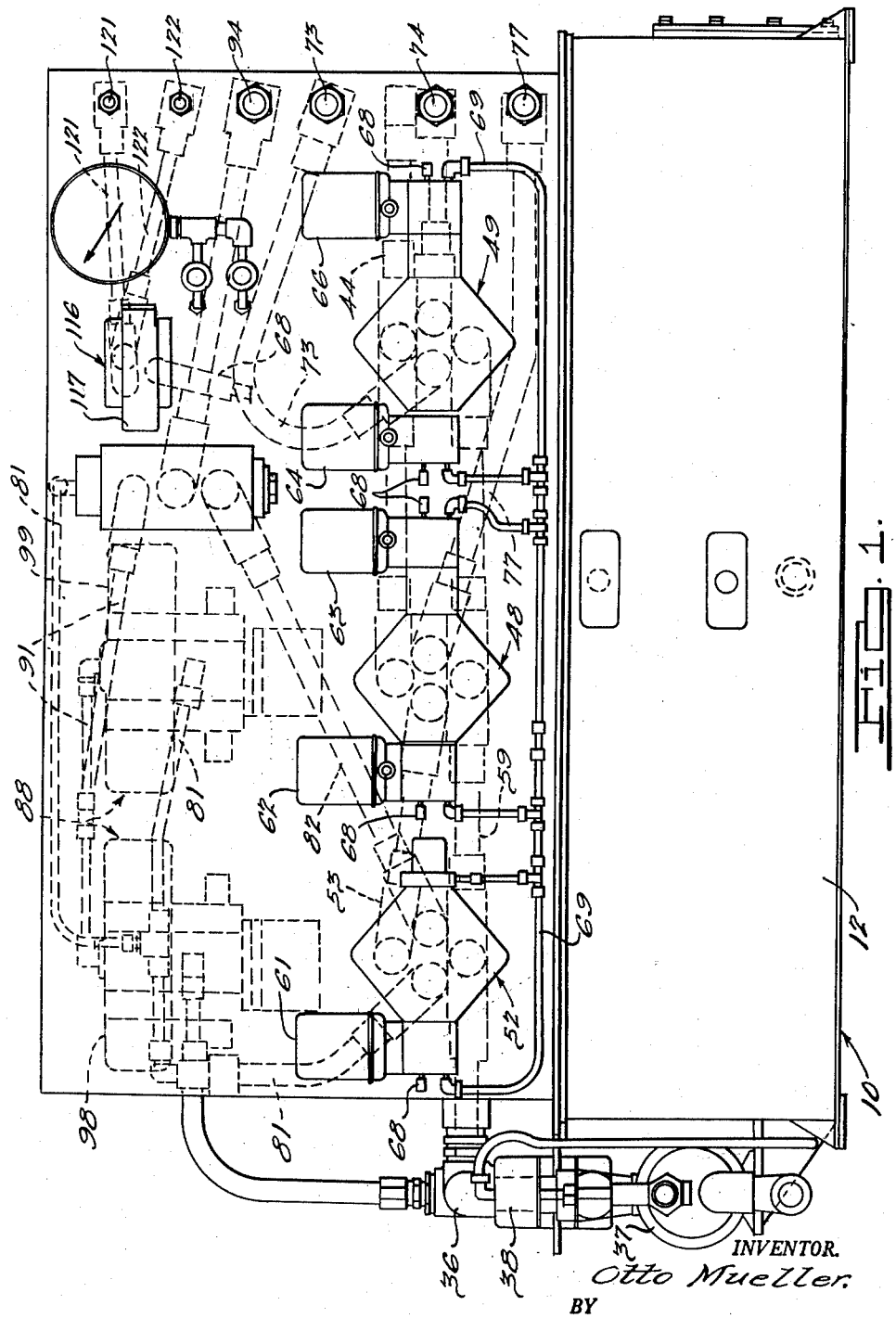
INVENTOR.
Otto Mueller.
BY
Harness, Dickey & Pierce
ATTORNEYS.

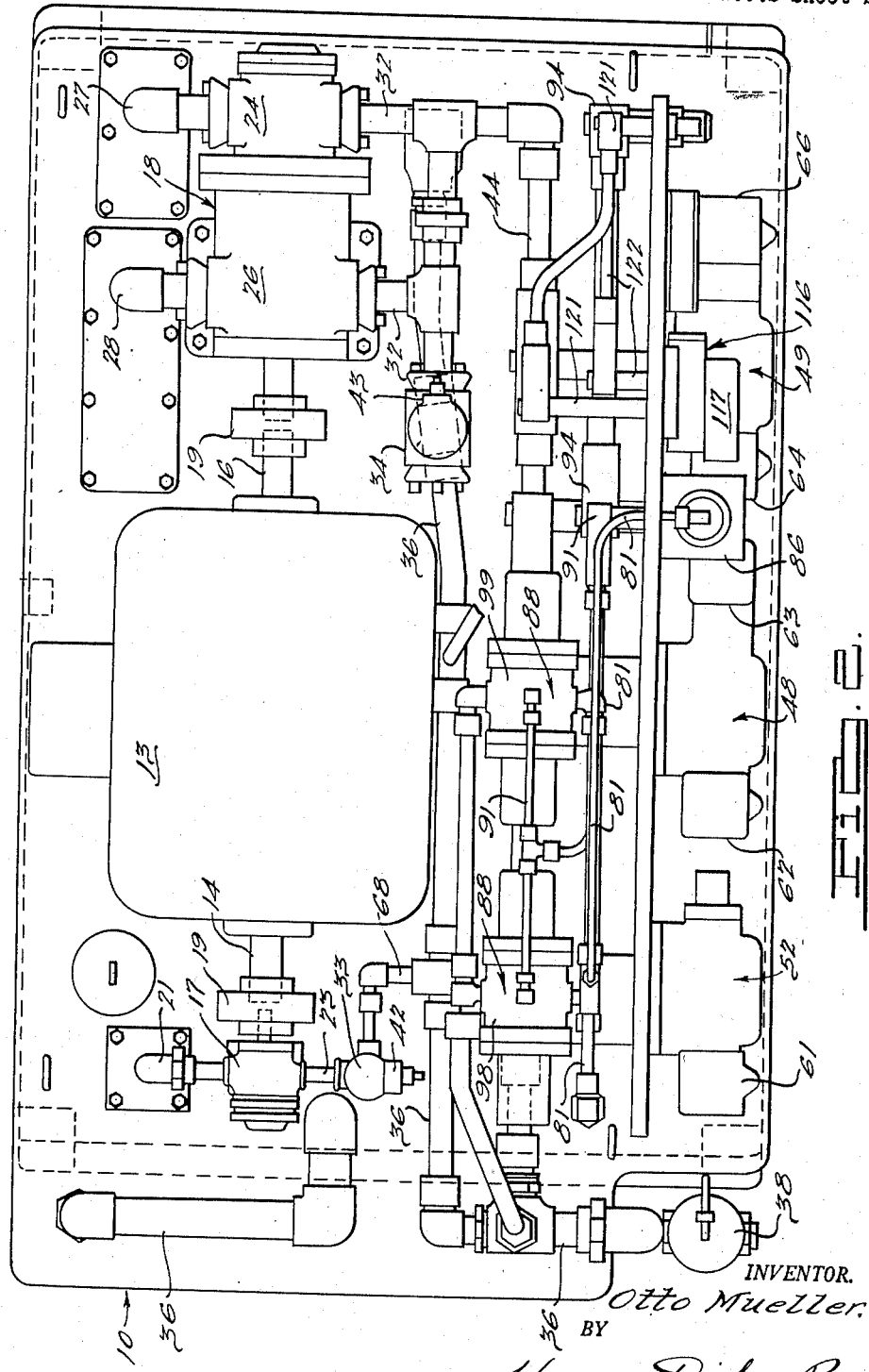

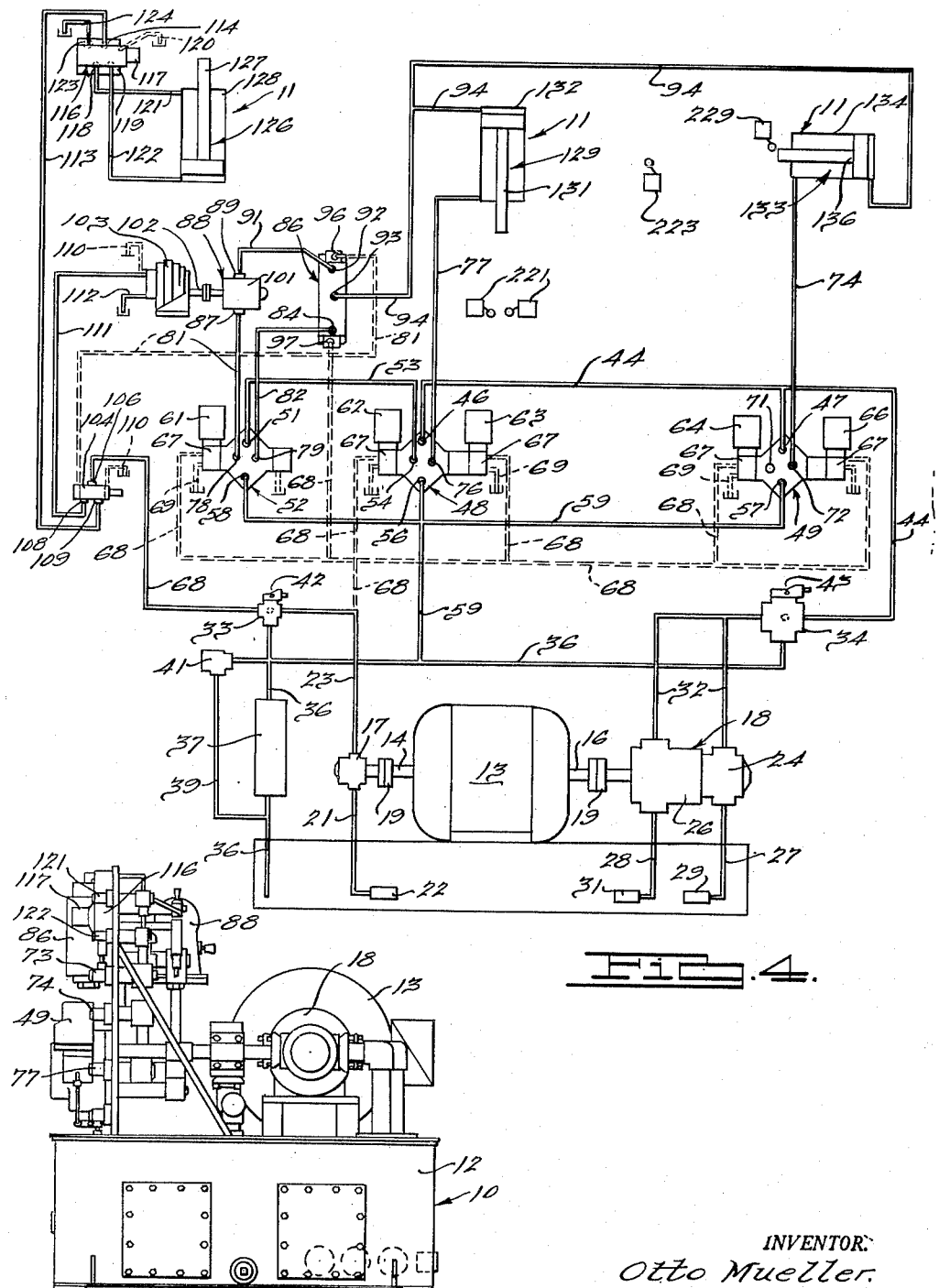

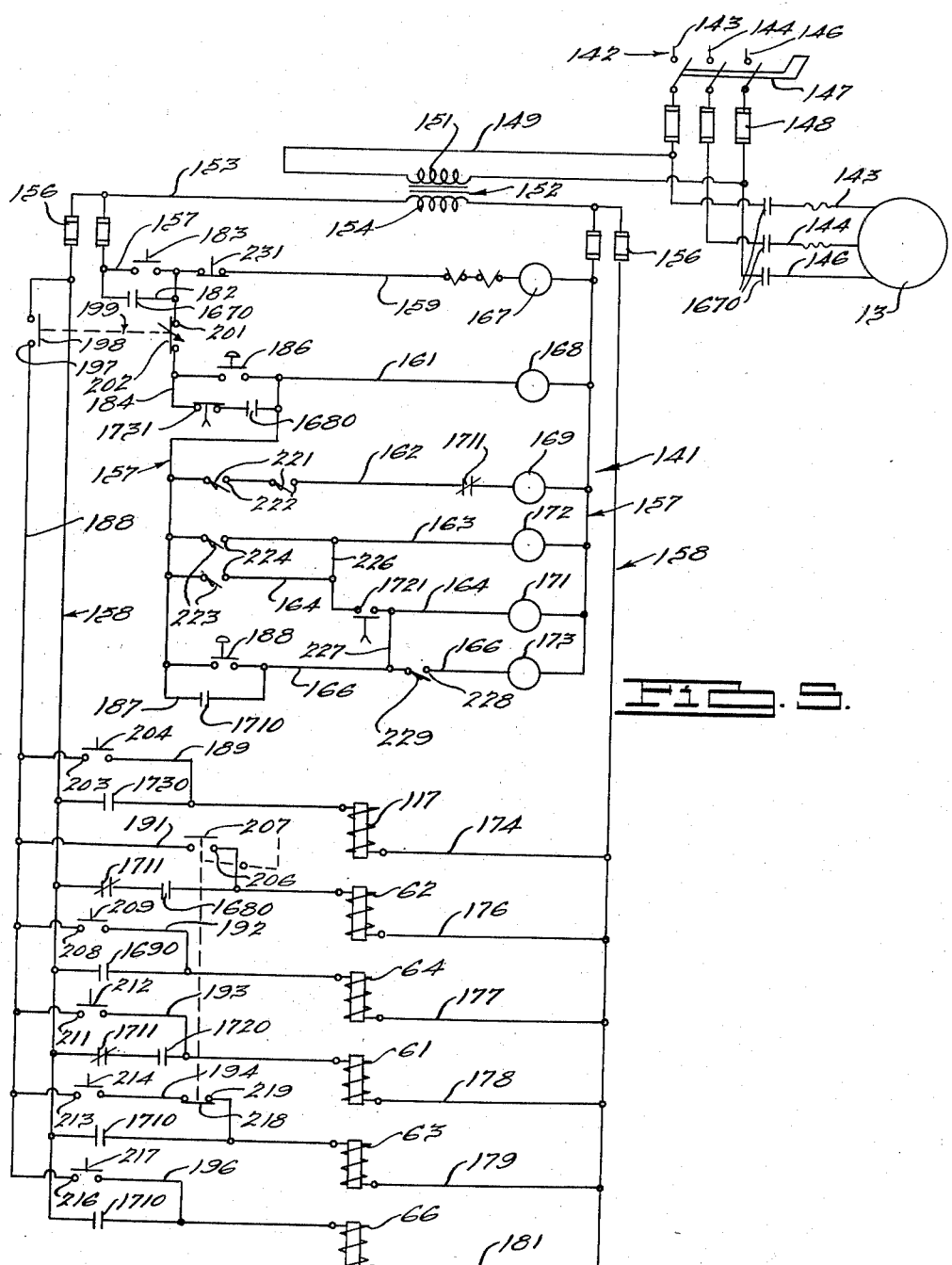

Patented Feb. 23, 1954

2,669,841

UNITED STATES PATENT OFFICE 2,669,841

HYDRAULIC FLUID CONTROL PANEL

Otto Mueller, Dearborn, Mich.

Application April 10, 1950, Serial No. 154,909

20 Claims. (Cl. 60—52)

This invention relates to apparatus for delivering hydraulic fluid at a plurality of pressures, and particularly to a power unit for delivering low and high pressure fluids from a single low pressure pump without employing high pressure valves.

Heretofore, apparatus for producing hydraulic power at a plurality of pressures has usually been engineered and constructed more or less on a special unit and power plant basis. By this is meant that it has been customary for a factory requiring such apparatus to build a single, perhaps centrally located and permanently installed, hydraulic pressure unit or plant to be used throughout the entire factory for supplying hydraulic fluid at different pressures to various apparatus. When building individual units, separate motors and pumps were also employed to produce hydraulic fluid at low and high pressures. In these types of installations, high pressure operated valves were required to change from the different pressures and these were expensive, leaked and were always a source of trouble.

The present invention embodies the construction of a relatively small, efficient and inexpensive unit for producing hydraulic power. Such a unit can be purchased when it is needed and placed where it is to be operated. It can be operated when it is needed, and it can be moved from one place to another in the factory when conditions require such movement, or it can be disposed of or replaced when it is not needed or when better or different equipment is both desirable and available. A factory can have few or many of these units, depending upon the needs of the factory, and these can be placed where the work should be done or near enough thereto so that an extensive and factory-wide conduit system is not required. These units can be separately controlled and many different fluid pressures may be made available in a factory so as to better suit the many and various needs that do arise.

An object of the invention is to provide a small, inexpensive, flexible and efficient hydraulic power unit capable of delivering fluid under low and high pressures.

Another object of the invention is to provide relatively small but flexible units for the production of hydraulic power at high pressure from a low pressure pump and booster in such an arrangement as to avoid the necessity of employing high pressure valves.

Another object of the invention is to provide a hydraulic power unit capable of delivering hydraulic power or fluid at several different pressures, including what might be considered extremely high pressures, and this without the necessity of using a control system for cutting on and off, various control valves operating at such high pressures.

Another object of the invention is to provide a self-contained power unit including a tank providing a supply and return chamber for the fluid and a base forming a support for elements of the unit.

A further object of the invention is to provide a hydraulic power unit that can be installed and used in the vicinity of piercing, welding, riveting or other machines or apparatus it is employed to operate.

Other objects and features of novelty of the invention will be specifically pointed out or will become apparent when referring, for a better understanding of the invention, to the following description taken in conjunction with the accompanying drawings, wherein:

Figure 1 is a side elevational view of a hydraulic power supplying unit embracing the principles of the invention;

Fig. 2 is a plan view of the structure shown by Fig. 1;

Fig. 3 is an end elevational view of the structures shown by Figs. 1 and 2;

Fig. 4 is a diagrammatical illustration of a power unit similar to that illustrated in Figs. 1, 2 and 3, and Fig. 5 is a diagrammatical illustration of an electrical control system which may be employed in controlling the operation of a power unit embracing the principle of the invention as disclosed by the preceding figures.

Referring particularly to Figs. 1, 2 and 3, there is indicated generally by the numeral 10 a relatively portable power unit embracing the principles of the invention. The unit 10 can be constructed in various sizes and capacities and can be employed for supplying hydraulic power at various pressures for operating machines, pistons or cylinders of machines employed in piercing, welding, riveting, clamping or holding metallic or other parts and subassemblies employed in manufacturing operations where high production, low cost and flexibility of operations are desirable, and for providing pressure fluid for any other requirement including injection molding. By way of illustration, an application of the structure disclosed in Figs. 1, 2 and 3 and indicated by the numeral 10, appears in Fig. 4, wherein the elements of the unit are illustrated as operating a plurality of work-performing cylinders 11 which are being utilized for purposes to be hereinafter described. Other examples of work-performing elements in the operation of which a power unit such as that illustrated by the numeral 10 may be employed, are disclosed in applicant's United States Patent No. 2,353,488, issued July 11, 1944, and No. 2,534,292, issued December 19, 1950 and copending application for Letters Patent, Serial No. 767,963, filed August 11, 1947, now Patent No. 2,586,695, issued February 19, 1952.

Referring particularly to Figs. 1 to 4, the power unit 10 comprises a relatively flat and preferably rectangularly shaped supply and return fluid tank 12 which is adapted also to provide a movable base or support for the other elements of which the power unit also is composed. The upper horizontal wall of the tank 12 has secured thereto a motor 13 having a drive shaft, the ends 14 and 16 of which project outwardly at opposite ends for driving pumps 17 and 18, respectively, through flexible couplings 19. The pump 17 has an inlet connection to the tank 12 through a conduit and a strainer indicated at 21 and 22, respectively, and has an outlet or supply conduit 23 for delivering pilot or relatively low pressure fluid to the other units or elements of the system.

The pump 17, or pilot fluid producing and delivering element of the system, consists of a single pumping unit or element capable of delivering pilot fluid required for the operation of certain of the elements of the power unit 10, disclosed in the drawings, and for use to actuate units of the work-performing machine. The pump 18 comprises a plurality of pumping units, indicated at 24 and 26, these being employed for the purpose of delivering the amount or volume of primary fluid required by the pumping unit 10 to supply the demand for primary fluid for operating the work-performing elements to which the system is connected. The pumping units 24 and 26 have inlet conduits 27 and 28 and strainers 29 and 31, respectively, for supplying fluid thereto from the tank 12, and outlet or supply conduits 32 for delivering primary fluid from the units of the pump 18 to the other elements of the unit 10 for actuating units of the work-performing machine.

To insure the delivery of pilot and primary fluids by the pumps 17 and 18, respectively, at relatively constant pressures and regardless of the demand upon the system for such fluids, the supply conduits 23 and 32 from the pumps referred to are connected to pressure-regulating valves 33 and 34, respectively, these valves being connected to a return conduit indicated at 36 for returning fluid not required for the operation of the system to the supply and return tank 12. The return conduit 36 has a water-cooled fluid cooler 37 inserted therein, in which cooler 37 the circulation of water or other cooling liquid is controlled by a temperature regulated flow control valve, indicated at 38 in Figs. 1 and 2. A fluid cooler, such as that indicated by the numeral 37 and which may be employed in the structure disclosed, is known in the trade as Ross Cooler #7-M-603AA. The regulator valve 38, such as Power's Regulator #11, should be set to produce a flow of cold water sufficient to maintain recommended operating temperatures.

A by-pass conduit, indicated at 39, is employed in the return conduit 36 and around the fluid cooler 37. This by-pass is controlled by a spring loaded valve, indicated at 41, which may be set in such a way as to permit the flow of oil to the tank 12 through the by-pass 39 in the event the pressure within the conduit in the cooler 37 exceeds a predetermined maximum value. The pressure regulating valves 33 and 34 are provided with adjustable pressure regulating heads, indicated at 42 and 43, respectively, these heads being employed on the valves for the purpose of providing adjustment for the pressures of the pilot and the primary fluids delivered by the pumps 17 and 18, respectively, to the system. Beyond the pressure regulating valve 34, the primary fluid for the system is delivered by a supply conduit 44 to pressure ports 46 and 47 of solenoid actuated valves 48 and 49, respectively. The primary fluid for the system is also delivered to a port 51 of a solenoid actuated valve 52 by a supply conduit, indicated at 53, which connects the pressure port 51 with a service port 54 of the solenoid actuated valve 48. The solenoid actuated valves 48, 49 and 52, in the structure illustrated, are known in the trade as Vickers Solenoid Actuated Control Valves, being specified as CK-2162-110-AC-SC, CK-2164-110-AC-SC and CK-2162-110-AC-SC valves, respectively. These valves are of the same type, the difference in specifications being employed merely to identify differences in the way the valves are assembled to obtain variations in normal operative positions.

The valves 48, 49 and 52 have return ports, respectively, indicated at 56, 57 and 58, which are connected by a return manifold or conduit 59 to return conduit 36, for the purpose of returning to the tank 12 the primary fluid supplied by the system to the various work-performing elements and after these elements have been actuated by the primary fluid in the performance of useful work.

For operating the solenoid actuated valves, the valve 52 is provided with a solenoid 61, the valve 48 with solenoids 62 and 63, the valve 49 with solenoids 64 and 66. These solenoids are electrically connected in the electrical control system illustrated in Fig. 5, to be hereinafter described. Valves indicated at 67 are provided at each end of the valves 48, 49 and 52, actuated by the associated solenoids for controlling the pilot fluid which shifts the valves 48, 49 and 52 in response to the operation of the solenoids 61, 62, 63, 64 and 66.

Valves 67 are each connected to a pilot fluid supply manifold or conduit, indicated at 68, which in turn is connected to the pilot fluid supply conduit, indicated at 23, the pressure in which is controlled through the pressure regulating valve 33. The valves 67 are also connected to a pilot fluid return manifold or conduit, indicated at 69, which communicates with the interior of the tank 12. Each of the solenoid actuated valves 48, 49 and 52 is provided with a pair of service ports adapted to supply or receive primary fluid used for actuating the work-performing elements operated by the system. For example, the valve 49 has service ports 71 and 72 to which service connections 73 and 74 are respectively connected, as illustrated in Fig. 1, the port 73 being blocked in the structure illustrated in Fig. 4. The valve 48 has service ports 54 and 76 to which service conduits 53 and 77 are respectively connected; and valve 52 has service ports 78 and 79 to which service connections 81 and 82 are respectively connected. The service connection 82 connected with port 79 of valve 52 at its opposite end is connected to a supply port 84 of a selector valve 86. The valve 86 is employed as is hereinafter described for supplying hydraulic fluid at primary pressure or at a relatively higher or secondary pressure to the work-performing units or cylinders operated by the system. The selector valve 86 is described in detail in the copending application of Otto Mueller, Serial No. 134,438, filed December 22, 1949.

The service connection 81 leading from supply port 78 of valve 52 likewise communicates with inlet ports 87 of a hydraulic fluid booster of the reciprocating or rotatory type, indicated generally at 88. The high pressure outlet port 89 of the booster 88 in turn communicates, through a service conduit 91, with an inlet port 92 of the selector valve 86 previously referred to. An outlet port 93 leading from selector valve 86 communicates with service conduit 94 which is adapted to supply hydraulic fluid to the work-performing elements operated by the system at either primary or secondary pressures as will be hereinafter described. The selector valve 86 also has a port indicated at 96 communicating with a branch of service conduit 81, which is adapted to supply primary fluid for operating the selector valve 86 in response to the operation of control valve 52. Another inlet port, indicated at 97, also communicates with a branch of pilot fluid supply conduit 68, for supplying pilot fluid for operating selector valve 86, as will be hereinafter described.

In the structure disclosed by Figs. 1, 2 and 3, the booster 88 comprises a pair of booster units indicated by the numerals 98 and 99. These booster units, which are connected in multiple to operate as a single booster mechanism or pump, are of a type known in the trade as differential piston booster units and may be purchased under the name Racine boosters. As disclosed in Fig. 4, the booster 88 comprises a rotary pumping unit, indicated at 101, adapted to be driven through a shaft 102 by a pilot fluid actuated fluid motor indicated at 103. The pilot fluid for operating fluid motor 103 is supplied by a valve 104 having an inlet port indicated at 106 which communicates with pilot fluid supply conduit 68. At one end, the valve 104 communicates with a branch of service conduit 81 for supplying primary fluid for actuating the valve 104 in one direction. The valve is operated in the opposite direction by a spring when the supply from the conduit 81 is cut off. A drain conduit 110 relieves pressure from any fluid collecting at the spring end of the valve. The pilot fluid supplied to valve 104 through port 106 is delivered from the valve by way of one or the other of the ports 108 or 109. In normal position, the fluid is delivered from the port 109 and when fluid pressure is applied to the end by the fluid supply conduits 81, fluid is delivered from the port 108. The port 108 communicates with a conduit 111 which supplies fluid to the fluid motor 103 for operating the motor. An exhaust or return conduit 112 returns to the tank 12 the expended fluid which has been used in operating the motor 103. The drain conduit 110 is also connected to tank for draining off any fluid which may accumulate in the pump.

The port 109 leading from the valve 104 likewise is connected by a conduit 113 to the inlet port 114 of a spring offset solenoid actuated valve 116. A solenoid 117 and a spring are adapted to operate the valve 116 between positions wherein the fluid admitted to the valve at port 114 will be discharged from the valve through one or the other of ports 118 or 119. The ports 118 and 119 are adapted to deliver this fluid through either of two service conduits, indicated at 121 and 122, respectively. The valve 116 also is provided with an exhaust port 123 communicating with exhaust conduit 124 through which fluid is returned to tank 12 from one or the other ports 118 or 119. A conduit 120 is connected to the tank for bleeding off any fluid which may collect within the spring end of the valve.

An application of the power unit 10, Fig. 4, illustrates how the unit may be connected to a plurality of working cylinders or work-performing elements, previously indicated by the numeral 11. One of these working cylinders or a group of such working cylinders is designated by the numeral 126 and is adapted to perform work such as might be done in ejecting an automobile frame sill, side member or other work or workpiece from a riveting or piercing machine or the like. When the piston 127 and the cylinder 128 of the working cylinder 126 are in the position illustrated in Fig. 4, work may be inserted in the machine so that the operations of the machine may be performed thereon. The piston 127 is retained at the bottom of the cylinder 128 by pilot fluid passing through the valve 116 from port 114 to port 118, thence through conduit 121 when the valve is in spring shifted position. In such position, the head end of the cylinder 128 communicates with the tank 12 through conduits 122 and 124 and the respective valve ports 119 and 123. When the solenoid 117 is energized, as will be hereinafter described, the valve 116 will shift so that port 114 will communicate with port 119 for supplying pilot fluid to the head end of the cylinder through conduit 122, and port 123 will communicate with port 118, thereby connecting the rod end of the cylinder to the tank 12 through conduits 121 and 124. Such a reversal of pilot fluid in the working cylinder 126 moves the piston 127 to the upper end of the cylinder 128, thereupon ejecting the work from the machine.

Another of the working cylinders 11, or a row or group of such working cylinders, is indicated at 129. This work-performing cylinder is disposed vertically in position to pierce or rivet in a vertical direction. The working cylinder 129 comprises a piston 131 and a cylinder 132, the head end of the cylinder being in open communication with delivery port 93 of selector valve 86 through conduit 94, the piston rod end being in communication with port 76 of control valve 43 through supply conduit 77. As illustrated in Fig. 4, the working cylinder 129 is in a position to receive work into the machine to be later clamped and punched or riveted.

After the work has been inserted in the machine and the motor energized, the fluid from the pump will be discharged to tank through the open-center spool valve 48. When the solenoid 62 is energized, the pilot fluid will shift the spool to connect port 54 with pressure port 51 of valve 52 from port 79 to supply line 82 into port 84 of selector valve 86. Fluid from the selector valve will pass therefrom out of port 93 through conduit 94 into the head ends of all of the cylinders 129 and 134. When the solenoid 62 is energized, it will also connect port 78 with port 56 of valve 48, permitting the cylinders 129 to discharge oil from the rod end through conduit 77 through valve 48 into the return line, therefore permitting the vertical cylinders to move into position and clamping the work firmly in place.

After the cylinders are in the position, limit switches 221 will be actuated, completing the circuit through the control panel and energizing solenoid 66 of valve 49, causing the pilot fluid to shift the valve. When the valve is shifted, the port 72 is connected with port 57, permitting fluid at the rod end of the cylinders 134 to return to tank, whereupon the cylinders move into work-engaging position. At this time, limit switch 223 will be actuated through the control panel for energizing solenoid 61 of valve 52 for causing the pilot fluid to shift the valve and connect ports 51 and 78 for supplying fluid to the conduit 81. The conduit 81 shown in full line supplies fluid to the booster 88 and through the conduit portions connected thereto, shown in dotted line, supplies fluid to the port 96 of the selector valve 86 and also to the valve 104. The dotted line showing of the conduit traces the flow of fluid when employed to shift the valves 86 and 104.

The valve 104 is shifted by the fluid delivered in the dotted conduit portion 81 to supply pilot fluid from the port 108 through the conduit 111 and is delivered to the fluid motor 103 for driving the pintle valve of the booster. The pintle valve delivers fluid to a plurality of hydraulically actuated differential pistons to produce an increase in pressure on the fluid delivered from the conduit 81 shown in solid line, which high pressure fluid is delivered from port 89 through conduit 91 to port 92 of the selector valve 86. The primary fluid delivered through the port 96 of the selector valve 86 from the portion of the dotted conduit 81 connected thereto causes the valve to shift and to connect the port 92 to the port 93 which communicates with the conduit 94. This high pressure fluid enters the head end of all of the cylinders 129 and 133, producing the required work-performing operations for which each cylinder was intended.

After a predetermined time, the solenoid 61 of valve 52, the solenoid 62 of valve 48, and the solenoid 64 of valve 49 are de-energized. Simultaneously, solenoid 63 of valve 48 and solenoid 66 of valve 49 are being energized. The spool in valve 52 returns to its initial position, cutting off the fluid supply to the valve 104 and to the port 96 of the selector valve 86, and the fluid in all of the conduit portions 81 is connected to tank. The spool of the valve 86 is shifted to its initial position under the influence of the pilot pressure applied to the port 97 thereof. Simultaneously, fluid from the port 84 of the selector valve is connected through conduit 82 to the port 79 of valve 52 from which it passes from port 58 to tank.

Upon the energization of the solenoids 63 and 66, the pilot pressure fluid shifts the associated valves to connect port 46 to port 76 of valve 48 from which fluid will pass into conduit 77 to the rod end of cylinders 129 and connecting port 47 to port 72 of valve 49 from which fluid will pass into conduit 74 to the rod end of cylinders 133. This pressure on the cylinders 129 and 133 forces the pistons at the head end of the cylinders to return to their original positions, exhausting the fluid at the head ends through the conduit 94, through the selector valve 86, through the conduit 82 to the valve 52 from which it is exhausted to tank. Thereafter, limit switch 229 is actuated to energize a magnetic timer for energizing the solenoid 117 of the spring-loaded valve 116. The energization of the solenoid shifts the valve 116, causing pilot pressure to flow to the head end of the cylinders 126 for operating the ejector mechanism for the work which is retained in operating position for a predetermined time, controlled by the relay. Thereafter, upon the de-energization of the relay, the solenoid 117 is de-energized, permitting the valve to return to its initial position, thereby reversing the flow of fluid on the piston and returning the piston and ejector mechanism to its initial position.

While the above description applies to the use of a rotary booster 88 which is driven by a fluid-actuated motor, the reciprocating type of boosters 98 and 99 illustrated in Figs. 1 and 2 will operate in the same manner to produce the increase in pressure. In such instances, the valve 104 is deleted since the conduit 81 is connected directly to the boosters to procure their operation, since the motor in this type of booster is not required for shifting a valve. In this arrangement, the solenoid actuated valve 116 is connected directly to the pilot fluid supply conduit 23 without passing through any valve such as that indicated at 104 in Fig. 4. It will be apparent from examining the two systems that one type of booster is merely the mechanical equivalent of the other and that there is no essential difference in the power unit regardless of which type of booster may be utilized. There is likewise no difference in the operation of the hydraulic system or of the electrical control system therefor, as will be hereinafter apparent.

Referring now to Fig. 5, numeral 141 indicates generally an electrical control system which may be employed in operating the power unit structure illustrated by Figs. 1 to 4. The system comprises a three-phase power line 142 consisting of conductors 143, 144 and 146 passing through a switch 147 and fuses 148 to the motor 13. A conductor 149 connects a primary coil 151 of a transformer 152 across the conductors 143 and 146 of the power line 142. A conductor 153 likewise connects the secondary coil 154 of transformer 152 through fuses indicated at 156 to the opposite ends of conductors 157 and 158. These conductors provide a pair of parallel 110-volt circuits for the electrical system energized by the transformer 152.

A plurality of conductors 159, 161, 162, 163, 164 and 166 having connected therein relays 167, 168, 169, 172, 171 and 173, respectively, are connected in parallel and included within the circuit 157. Also, another plurality of conductors 174, 176, 177, 178, 179 and 181 and including therein the coils of solenoids 117, 62, 64, 61, 63 and 66, respectively, are connected in parallel and included within the circuit 158.

The relay 167 controls a plurality of pairs of normally open contacts 1670 inserted in the conductors 143, 144 and 146 of the power line 142 for supplying electrical current to the motor 13. These contacts are adapted to be closed by switch bars operated by the relay 167 for closing the circuits through the contacts when the relay 167 is energized. Also, in a shunt circuit 182, around a manually controlled starting switch 183 provided across the circuit 157, is another pair of contacts 1670, having a switch bar adapted to be closed by the energization of the relay 167.

The relay 168 controls a pair of normally open contacts 1680 which are provided in a shunt conductor 184 which extends around a manually controlled switch 186 provided in conductor 161 supplying current to the relay 168. Another pair of contacts 1680 is provided in the conductor 176 supplying current to the solenoid 62. The relay 168 closes the contacts 1680 when the coil of the relay is energized. Relay 169 is adapted when energized to close a pair of contacts 1690 inserted in the conductor 177 supplying current to the solenoid 64.

The relay 171 controls a pair of normally closed contacts 1711 in the conductor 162 supplying current to the relay 169, a pair of normally open contacts 1710 in a shunt circuit 187 around a manually operated switch 188 in the conductor 166 supplying current to the relay 173, a pair of contacts 1711 in the conductor 176 supplying current to the solenoid 62, a pair of contacts 1711 in the conductor 178 supplying current to the solenoid 61, a pair of contacts 1710 in conductor 179 supplying current to the solenoid 63 and a pair of contacts 1710 in conductor 181 supplying current to the solenoid 66. The contacts 1711 are opened and the contacts 1710 are closed when the relay 171 is energized. The relays 172 and 173 are of the time-controlled relay type.

The time relay 172 controls a pair of normally open contacts 1720 across conductor 178 supplying current to the solenoid 61 and a pair of normally closed contacts 1721 across the conductor 164 supplying current to the relay 171. When the relay 172 is energized, the contacts 1720 are immediately closed and the contacts 1721 are immediately open, and after a period of time for which the relay is set, the contacts return to their initial positions.

The relay 173 has a pair of normally open contacts 1730 across the conductor 174 providing current for the solenoid 117 and a pair of normally closed contacts 1731 in shunt 184 around the starting switch 186 in the conductor 161 supplying current to relay 168 in series with the contacts 1689. Contacts 1730 are closed upon the energization of relay 173 and contacts 1731 are opened by such energization after a period time for which the relay is set.

For operating the system either manually or automatically or for controlling the system manually at any stage in the operation thereof and then automatically beyond such stage, there is provided a shunt circuit or conductor 188 in the circuit 158. A branch conductor 189 from the conductor 188 extends around the contacts 1730 in the conductor 174. A branch conductor 191 from the conductor 188 extends around the contacts 1711 and 1689 in the conductor 176. A branch conductor 192 from the conductor 188 extends around the contacts 1690 in the conductor 177. A branch conductor 193 from the conductor 188 extends around the contacts 1711 and 1720 in the conductor 178. A branch conductor 194 from the conductor 188 extends around the contacts 1710 in the conductor 179, and a branch conductor 196 from the conductor 188 extends around the contacts 1710 in the conductor 181.

A pair of contacts 197 is provided in the conductor 188 which is adapted to be closed by contact bar 198 of a two-way contact switch 199. Contacts 201 disposed in the conductor 157 also are provided with a contact bar 202 forming a part of the two-way contact switch 199. The switch 199 may be operated for opening the shunt circuit, indicated at 188, and closing the circuit 157 by separating the bar 198 from the contacts 197 and engaging the bar 202 with the contacts 201. The systems thereupon will be capable of automatic operations, as will be hereinafter described.

In order to provide for manual operation of the system or any part thereof, there is provided in the conductor 189 a pair of contacts 203 adapted to be closed by a manually operable switch 204; in the conductor 191 a pair of contacts 206 is adapted to be closed by a manually operable switch bar 207; in the conductor 192 a pair of contacts 208 is adapted to be closed by a manually operable switch bar 209; in the conductor 193 a pair of contacts 211 is adapted to be closed by a manually operable switch bar 212; in the conductor 194 a pair of contacts 213 is adapted to be closed by a manually operable switch bar 214, and in the conductor 196 a pair of contacts 216 is adapted to be closed by a manually operable switch bar 217. The switch bar 207 is mechanically interlocked with a switch bar 218 which engages a pair of contacts 219 provided in conductor 194, when the switch bar 207 is separated from the contacts 206. When the contacts 206 are engaged by operation of the contact bar 207, the contacts 219 will be opened.

By operating switch 199 to open the automatic circuit provided by conductor 157 and to close the manual circuit provided by shunt conductor 188, it will be possible to operate any of the elements of the system by manually operating the switches 204, 207, 209, 212, 214, 217 or any of them.

To make the relay 169 responsive to the operation of the working cylinder 129 (see Fig. 4), or to the operations of any number of working cylinders 129, there is provided a plurality of limit switches, as indicated at 221. The limit switches 221 are positioned with respect to the cylinders 129 in such way as to be engaged by the piston rods 131 thereof when the rods are extended from the cylinders to the limit of their movement during the work-performing operations. The pairs of contacts for the switches 221 are indicated at 222 and are inserted in conductor 162 supplying current to the relay 169. Limit switches 223 also are positioned with respect to one or more horizontal cylinders, such as that indicated at 133, in such manner as to be engaged by the rods of working cylinders 133 when the rods are extended from the cylinders and adjacent the limit of movement thereof required for the performance of the work required of the cylinders. The pairs of contacts for switches 223, which are indicated at 224, are inserted in conductors 163 and 164 to provide for the energization of the relay 172 when the switches are closed after the operation of the cylinders 123.

A shunt circuit also is provided at 226 between conductors 163 and 164 leading to relays 172 and 171, respectively. Another shunt circuit, indicated at 227, extends between conductors 164 and 166 leading to solenoids 171 and 173, respectively. Inserted in parallel in conductor 166 supplying current to relay 173, is a plurality of other limit switches having contacts 228 and indicated at 229 and positioned with respect to cylinders 133 so that the rods of such cylinders will engage the switches for maintaining a closed circuit across contacts 228 when the pistons have been retracted. At all other times the limit switches 229 will be actuated to open the circuits between the contacts 228.

When assembling the apparatus comprising the hydraulic power unit 10 embracing the principles of the invention, it is very desirable that a simplified and easily serviced and installed conduit system be employed between the various elements of the structure and in connecting the unit to the work-performing elements of the machine with which the unit is to be employed. Also, due to the high fluid pressures employed in the conduit system embraced in the structure, it is advisable to employ conduits and conduit connections capable of operating under these pressures without leaking. It has therefore been found advisable to employ a conduit system, such as that disclosed in the Otto Mueller copending application, Serial No. 31,955, filed June 9, 1948.

In the system or unit disclosed by Figs. 1 to 4, it will be assumed, for purposes of illustration, that pressure regulating valves capable of providing a constant pilot fluid pressure of 400 pounds per square inch, as one example, and a constant primary fluid pressure of 1000 pounds per square inch, as another example, have been employed. Thus, the valve 33 may be adjusted in such a way as to provide a fluid pressure of 400 pounds per square inch in the pilot fluid supply conduit 23 and the valve 34 may be adjusted to provide a primary fluid pressure of 1000 pounds per square inch in the primary fluid supply conduit 44. Also, it is assumed that one pilot fluid pumping unit, such as that indicated at 17, will supply the volume of pilot fluid at 400 pounds per square inch required by the power unit, and that one or the two primary fluid pumping units, indicated at 18, will supply the volume of primary fluid at 1000 pounds per square inch to meet the maximum requirement.

Also, it will be assumed that a five to one ratio booster mechanism has been employed so that the secondary pressure of the fluid employed for piercing purposes will be 5000 pounds per square inch. It is to be understood, however, that these pressures may be varied substantially to meet the output requirements. As pointed out above, it is possible to operate the system either manually or automatically throughout a complete working cycle in the manner hereinafter described.

To operate the system, assuming the switch 147 is closed, it is necessary first to close the switch 183 for starting the motor 13. The instantaneous closing of switch 183 energizes relay 167, thereby closing the contacts 1670, for closing the shunt circuit 182 around the motor start switch 183. Thereafter, the motor 13 will run continually for either manual or automatic operation. A switch 231 shuts off the supply of current to the motor and interrupts the fluid supply and the supply of power at any point in the operating cycle. To operate the system manually, it is necessary only to actuate the switch 199 to close the contacts 197 and to open the contacts 201. Thereafter, any unit of the mechanism may be operated by manually actuating the switches 204, 207, 209, 212, 214 or 217. It is possible also to start the automatic operation of the system manually and at any stage in the cycle of operation of the system by closing any one of the switches 204, 207, 209, 212, 214 and 217 and at the same time actuating the switch 199 to close the contacts 201 and open contacts 198.

For fully automatic operation, assuming the switch 199 to have closed the contacts 201, and assuming the motor 13 to be running, it is necessary only to place a part or piece of work in the machine being operated and to manually close the automatic start switch 186. The instantaneous closing of the switch 186 closes the electrical circuit through relay 168, thereby closing contacts 1680 for closing the shunt circuit around start switch 186 and for closing the circuit for energizing the solenoid 62 of flow control valve 48. When solenoid 62 is energized, actuating valve 67 moves in response to pilot fluid pressure in pilot fluid supply line 68, thereby shifting control valve 48 to connect ports 54 and 46 of valve 48, thereby connecting primary fluid supply conduit 44 to conduit 53. Control valve 52 being spring offset in such position as to provide normal communication between ports 51 and 79, it will be apparent that the primary fluid pressure in conduit 53 will be immediately communicated to port 84 of selector valve 86 by conduit 82. Since port 97 of selector valve 86 normally is in open communication with pilot fluid conduit 68 and since the effect of pilot fluid pressure upon selector valve 86 positions the valve to provide open communication between the ports 84 and 93 thereof, it will be apparent that primary fluid supplied by the conduit 82 will be conducted through the valve 86 and to the head ends of the working cylinders 129 and 133.

Simultaneously with the movement of control valve 48 to provide communication therein between ports 54 and 46 thereof, there is also provided within the valve 48 communication between ports 56 and 76 of valve 48, thereby providing through conduit 77 open communication between the rod end of working cylinder 129 and return fluid conduit or manifold 59. However, since control valve 49 is a spring offset valve, similar to the spring offset valve 52, it is adapted normally to provide open communication between ports 47 and 72 thereof, thereby supplying primary fluid from supply conduit 44 to the rod end of working cylinder 133, through conduit 74.

Considering the working cylinders 129 and 133, it will be apparent that when primary fluid pressure is applied to the head ends and the rod ends of the cylinder 129 are open to tank while the rod ends of working cylinders 133 are not, pistons 131 in working cylinders 129 will move into a position to perform the work operations.

When the pistons 131 and the vertical cylinders 129 have approximately moved to work-performing position previously referred to, the limit switches 221 are actuated, thereby closing the contacts 222 and energizing the relay 169. The energization of relay 169 closes contacts 1690 for energizing solenoid 64 of control valve 49, thereby establishing communication between ports 47 and 72 and opening communication through the valve between ports 57 and 72 thereof. Such communication will connect the rod ends of working cylinders 133 to the tank 12 through conduits 74 and 59. Pistons 136 thereupon will move to work-performing position in sequence with the movement of the cylinders 129.

Upon completion of the movement of the pistons 136, limit switches 223 will be engaged and actuated in such a way as to close the circuit through timer relay 172, thereby closing the contacts 1720 for energizing the solenoid 61 of control valve 52. The operation of solenoid 61 shifts the actuating valve 67 for changing the control valve 52 in such manner as to close the communication between ports 51 and 79 thereof, thereafter connecting ports 51 and 78 and ports 79 and 58. Primary fluid thereupon is supplied by conduit 81 to the port 96 for shifting the selector valve 86 in such a manner as to provide direct communication between ports 92 and 93 and for actuating the booster as previously described for supplying fluid at secondary or high pressure from the booster to the head ends of vertical and horizontal working cylinders 129 and 133, respectively. By increasing the pressure in the head ends of the cylinders 129 and 133 from primary to secondary pressures or according to the example given, from 1000 to 5000 pounds per square inch, the pistons 131 and 136 simultaneously perform the vertical and horizontal riveting or piercing operations upon the work.

When the time runs out, resulting from the actuation of timer relay 172, time contacts 1721 close the circuit through conductor 164, thereby energizing relay 171, which results in the opening of all contacts 1711 and closing all contacts 1710. Thereupon, relay 169 is de-energized, solenoids 62 and 61 are de-energized, solenoids 63 and 66 are energized, and the time relay 173 is energized.

When solenoid 61 is de-energized, communication is immediately cut off between ports 51 and 78 and is established between ports 79 and 58 of valve 52, thereby rendering the booster 88 inoperative for supplying secondary fluid to the head ends of working cylinders 129 and 133 and primary pressure to the port 96 of the selector valve. As the high pressure in the selector valve is relieved, the pilot fluid from the port 97 shifts the valve to its original position, connecting the head ends of the cylinders to the tank 12 through conduits 82 and 59. The de-energization of solenoid 62 likewise cuts off communication between ports 46 and 54 of control valve 48, thereby discontinuing the flow of primary fluid to the pressure port 51 of control valve 52 through the conduit 53. The energization of solenoids 63 and 66 of control valves 48 and 49, respectively, results in the opening of communications between ports 46 and 76 and 47 and 72 of the control valves, respectively, hence supplying primary fluid to the rod ends of the working cylinders 129 and 133 through conduits 77 and 74, respectively. Such reversal of pressure conditions within the cylinders 129 and 133 results in withdrawing the working cylinder pistons, thereby removing the riveting or piercing tools from the work and releasing the work in the machine.

When the pistons 136 are completely withdrawn within the cylinders 133, the limit switches 229 are actuated in such a way as to close the circuit through timer relay 173, thereby closing contact 1730 for energizing solenoid 117 which actuates the valve 116 in such manner as to connect the head end of ejector cylinder 126 with the pilot fluid supply line 68 and the rod end to the return line 124 communicating with the tank 12. The pistons 127 thereupon are moved from the cylinder 126 to eject the work from the machine. When the contacts 1731 are open through the operation of the time controlled relay 173, the circuit established by the conductor 157 will be open, thereby de-energizing solenoids 117, 63 and 64 and resetting the control apparatus for the next automatic cycle of operations.

The valve 116 is spring reset upon the de-energization of the solenoid 117, thereby reversing the connections to the cylinders 126 and connecting the rod ends of the cylinders to the pilot line 68 and the head ends to tank 12. The pistons 127 thereupon will be withdrawn within the cylinders 126 for the purpose of permitting the machine to be reloaded with additional work.

What is claimed is:

1. A self-contained device for supplying hydraulic fluid at a plurality of pressures including, in combination, a tank containing a fluid, a pump for supplying fluid from said tank, a booster acting upon and driven by the fluid from the pump for continuously supplying fluid at increased pressure, and a valve through which the fluid from said pump and said booster is delivered to perform work at pump and booster pressures, said valve being shifted by pump pressure.

2. A self-contained device for supplying hydraulic fluid at a plurality of pressures including, in combination, a tank containing a fluid, a pump for supplying fluid from said tank at normal pressure, a motor for driving said pump, a second pump driven by said motor for supplying fluid at lower than normal pressure, a booster driven by said fluid at normal pressure for increasing the pressure on a portion of said normal fluid, a valve through which said fluid from said first pump and from said booster is delivered selectively to perform work at normal and high pressures, said valve being shifted by normal pressure for delivering fluid at a pressure higher than normal, said valve being returned to initial position for delivering fluid at normal pressure by said fluid at lower pressure when said fluid at normal pressure which shifted the valve is cut off therefrom.

3. A self-contained device for delivering fluid under a plurality of pressures including, in combination, a tank containing a fluid, a motor, a pump driven by said motor for supplying fluid at normal pressure, a supply of fluid at a pressure lower than normal pressure, a booster for increasing the pressure of normal fluid to supply fluid at high pressure, a selector valve for selectively delivering fluid at normal and at high pressures, control valves for directing the flow of normal fluid through said selector valve to perform work, to return fluid to the tank, to direct fluid to the booster and to one end of the selector valve for operating the latter to a position to pass fluid at high pressure, means to return the selector valve to its initial position when the fluid delivered to said one end thereof is directed to tank, and means effective when said fluid is directed to tank to relieve the high pressure remaining in the selector valve, the relief of which renders said first means effective to return the selector valve to its initial position.

4. A self-contained device for delivering fluid under a plurality of pressures including, in combination, a tank containing a fluid, a motor, a pair of pumps driven by said motor one for supplying fluid at normal pressure and the other for supplying fluid at low pressure, a booster for increasing the pressure of normal fluid to supply fluid at high pressure, a selector valve for selectively delivering fluid at normal and at high pressures, and control valves for directing the flow of normal fluid through said selector valve to perform work, to return fluid to the tank, to direct fluid to the booster and to the selector valve for operating the latter to pass fluid at high pressure, said low pressure fluid operating said control valves and returning the selector valve to its initial position when the fluid under normal pressure which operated the selector valve is relieved therefrom.

5. A self-contained device for delivering fluid under a plurality of pressures including, in combination, a tank containing a fluid, a motor, a pair of pumps driven by said motor one for supplying fluid at normal pressure and the other for supplying fluid at low pressure, a booster for increasing the pressure of normal fluid to supply fluid at high pressure, a selector valve for selectively delivering fluid at normal and at high pressures, control valves for directing the flow of normal fluid through said selector valve to perform work, to return fluid to the tank, to direct fluid to the booster and to the selector valve for operating the latter to pass fluid at high pressure, said low pressure fluid operating said control valves and returning the selector valve to its initial position when the fluid under normal pressure which operated the selector valve is relieved therefrom, and solenoid means for operating the low pressure fluid supply to said control valves.

6. A self-contained device for delivering fluid under a plurality of pressures including, in combination, a tank containing a fluid, a motor, a pair of pumps driven by said motor one for supplying fluid at normal pressure and the other for supplying fluid at low pressure, a booster for increasing the pressure of normal fluid to supply fluid at high pressure, a selector valve for selectively delivering fluid at normal and at high pressures, control valves for directing the flow of normal fluid through said selector valve to perform work, to return fluid to the tank, to direct fluid to the booster and to the selector valve for operating the latter to pass fluid at high pressures, said low pressure fluid operating said control valves and returning the selector valve to its initial position when the fluid under normal pressure which operated the selector valve is relieved therefrom, solenoid means for operating the low-pressure fluid supply to said control valves, and an electrical control circuit for operating said solenoid means.

7. A self-contained device for supplying fluid under a plurality of pressures including, in combination, a tank, a panel on said tank, a motor on said tank, a pump on said tank driven by said motor for producing a flow of fluid at normal pressure, a supply of fluid at a pressure lower than said normal pressure delivered to said panel, a booster on said panel operated by said fluid at normal pressure for continuously delivering fluid at high pressure, a selector valve on said panel shiftable to supply fluid at normal and high pressures during the absence of high pressure in the valve, and control valves on said panel for controlling the supply of fluid at normal pressure to and from one end of said selector valve for controlling its operation in the absence of high pressure in the selector valve.

8. In a self-contained device for supplying fluid at low pressure, medium working pressure and high pressure including, in combination, a tank, a motor on said tank, a pump driven by said motor for producing a flow of fluid at medium pressure, means providing a flow of fluid at a pressure lower than said medium pressure, and a booster operated by fluid at medium pressure for raising a portion of the fluid at medium pressure to high pressure and for continuously delivering fluid at high pressure, said motor, pump and booster being supported by said tank.

9. In a self-contained device for supplying fluid at low pressure, medium working pressure and high pressure including, in combination, a tank, a motor on said tank, a pump driven by said motor for producing a flow of fluid at medium pressure, means providing a flow of fluid at a pressure less than said medium pressure, a booster operated by fluid at medium pressure for raising a portion of the fluid at medium pressure to high pressure and for continuously delivering fluid at high pressure, said motor, pumps and booster being supported by said tank, a panel supported by said tank, and a selector valve supported on said panel through which fluid at medium and high pressures is selectively conducted through the shifting of said valve by fluid at a pressure less than high pressure.

10. In a self-contained device for supplying fluid at low pressure, medium working pressure and high pressure including, in combination, a tank, a motor on said tank, a pair of pumps driven by said motor one producing a flow of fluid at low pressure and the other producing a flow of fluid at medium pressure, a booster operated by fluid at medium pressure for raising a portion of the fluid at medium pressure to high pressure, said motor, pumps and booster being supported by said tank, a panel supported by said tank, a selector valve supported on said panel through which fluid at medium and high pressures is selectively conducted, said selector valve containing a spool shiftable lengthwise, a supply conduit from said medium pressure supply connected to one end of said selector valve for shifting the spool for changing the delivered fluid from medium to high pressure, and a conduit connected from the low pressure supply to the opposite end of the valve for returning said spool to initial position automatically when the supply of fluid at medium pressure is cut off from said one end.

11. In a self-contained device for supplying fluid at low pressure, medium working pressure and high pressure including, in combination, a tank, a motor on said tank, a pair of pumps driven by said motor one producing a flow of fluid at low pressure and the other producing a flow of fluid at medium pressure, a booster operated by fluid at medium pressure for raising a portion of the fluid at medium pressure to high pressure, said motor, pumps and booster being supported by said tank, a panel supported by said tank, a selector valve supported on said panel through which fluid at medium and high pressures is selectively conducted, said selector valve containing a spool shiftable lengthwise, a supply conduit from said medium pressure supply connected to one end of said selector valve for shifting the spool for changing the delivered fluid from medium to high pressure, a conduit connected from the low pressure supply to the opposite end of the valve for returning said spool to initial position automatically when the supply of fluid at medium pressure is cut off from said one end, said panel having apertures therethrough for the passage of the fluid at medium and low pressures to the ends of the valve for shifting the valve spool, said panel also having an aperture through which fluid at medium and high pressure is delivered from the valve, said panel also having a pair of apertures therethrough one for delivering fluid at medium pressure and the other for delivering fluid at high pressure to said valve, and means for securing the selector valve to the face of said panel with the apertures of the valve aligned with the apertures through the panel and sealed thereto.

12. In a self-contained device for supplying fluid at low pressure, medium working pressure and high pressure including, in combination, a tank, a motor on said tank, a pair of pumps driven by said motor one producing a flow of fluid at low pressure and the other producing a flow of fluid at medium pressure, a booster operated by fluid at medium pressure for raising a portion of the fluid at medium pressure to high pressure, said motor, pumps and booster being supported by said tank, a panel supported by said tank, a selector valve supported on said panel through which fluid at medium and high pressures is selectively conducted, said selector valve containing a spool shiftable lengthwise, a supply conduit from said medium pressure supply connected to one end of said selector valve for shifting the spool for changing the delivered fluid from medium to high pressure, a conduit connected from the low pressure supply to the opposite end of the valve for returning said spool to initial position automatically when the supply of fluid at medium pressure is cut off from said one end, said panel having apertures therethrough for the passage of the fluid at medium and low pressures to the ends of the valve for shifting the valve spool, said panel also having an aperture through which fluid at medium and high pressure is delivered from the valve, said panel also having a pair of apertures therethrough one for delivering fluid at medium pressure and the other for delivering fluid at high pressure to said valve, and means for securing the selector valve to the face of said panel with the apertures of the valve aligned with the apertures through the panel and sealed thereto, said seal for the apertures conducting fluid at low and medium pressures for shifting the spool being sealed by O-rings, the apertures for delivering fluid at normal and high pressures to and from the valve being sealed by metal sleeves which are urged into sealed relation by the pressure of the fluid passing through said sleeves.

13. In a self-contained device for supplying fluid at low pressure, medium working pressure and high pressure including, in combination, a tank, a motor on said tank, a pair of pumps driven by said motor one producing a flow of fluid at low pressure and the other producing a flow of fluid at medium pressure, a booster operated by fluid at medium pressure for raising a portion of the fluid at medium pressure to high pressure, said motor, pumps and booster being supported by said tank, a panel supported by said tank, a selector valve supported on said panel through which fluid at medium and high pressures is selectively conducted, said booster also being secured to said panel, control valves secured to said panel shiftable by fluid delivered at low pressure, conduits connecting the low pressure supply of fluid to said control valves and one end of said selector valve and the medium pressure supply of fluid to said valves, to said booster, to said selector valve and to said tank, pressure regulating valves in the delivery conduit of said pumps by which the flow of fluid at low and medium pressures delivered thereby may be adjusted, solenoid actuated valves on said panel for controlling the flow of the low pressure fluid to said control valves, and a second panel on said tank containing an electric circuit for controlling the sequential actuation of the solenoid valves to regulate the flow of the fluid relative to the work to be performed.

14. A self-contained device for supplying fluid at a plurality of pressures, a tank for holding the fluid forming the base of the device, a motor and a pair of pumps mounted on said tank for delivering fluid from one pump at low pressure and from the other pump at normal working pressure, a panel supported by said tank, a booster on said panel operated by fluid at normal pressure for delivering fluid at high pressure whereby to provide a self-contained unit delivering fluid at three pressures, and a selector valve for controlling the delivery of fluid at normal and at high pressures shifted by said normal pressure when said booster is operated at normal pressure for delivering fluid at high pressure, said low pressure fluid shifting said selector valve to initial position for delivering fluid at normal pressure when said fluid at normal pressure which shifted the valve is cut off therefrom.

15. A self-contained device for supplying fluid at a plurality of pressures, a tank for holding the fluid forming the base of the device, a motor and a pair of pumps mounted on said tank for delivering fluid from one pump at low pressure and from the other pump at normal working pressure, a panel supported by said tank, a booster on said panel operated by fluid at normal pressure for delivering fluid at high pressure whereby to provide a self-contained unit delivering fluid at three pressures, a selector valve for controlling the delivery of fluid at normal and at high pressures shifted by said normal pressure when said booster is operated at normal pressure for delivering fluid at high pressure, said low pressure fluid shifting said selector valve to initial position for delivering fluid at normal pressure when said fluid at normal pressure which shifted the valve is cut off therefrom, a panel on said tank for supporting said booster and selector valve, a plurality of control valves on said panel actuated by fluid at low pressure for controlling the flow of normal fluid to the booster, the selector valve, to tank and to conduits which supply fluid to work-performing elements separate from the device, and solenoid means for controlling the supply of fluid at low pressure to said control valves.

16. A self-contained device for supplying fluid at a plurality of pressures, a tank for holding the fluid forming the base of the device, a motor and a pair of pumps mounted on said tank for delivering fluid from one pump at low pressure and from the other pump at normal working pressure, a panel supported by said tank, a booster on said panel operated by fluid at normal pressure for delivering fluid at high pressure whereby to provide a self-contained unit delivering fluid at three pressures, a selector valve for controlling the delivery of fluid at normal and at high pressures shifted by said normal pressure when said booster is operated at normal pressure for delivering fluid at high pressure, said low pressure fluid shifting said selector valve to initial position for delivering fluid at normal pressure when said fluid at normal pressure which shifted the valve is cut off therefrom, a panel on said tank for supporting said booster and selector valve, a plurality of control valves on said panel actuated by fluid at low pressure for controlling the flow of normal fluid to the booster, the selector valve, to tank and to conduits which supply fluid to work-performing elements separate from the device, solenoid means for controlling the supply of fluid at low pressure to said control valves, and conduits interconnecting said valves, booster and pump and providing terminal ends for the delivery and return to tank of fluid under normal pressure and fluid under normal and at high pressures, said terminal ends providing connecting means by which the conduits from work-performing elements are conductively joined to said device.

17. A self-contained device for supplying fluid at a plurality of pressures, a tank for holding the fluid forming the base of the device, a motor and a pair of pumps mounted on said tank for delivering fluid from one pump at low pressure and from the other pump at normal working pressure, a panel supported by said tank, a booster on said panel operated by fluid at normal pressure for delivering fluid at high pressure whereby to provide a self-contained unit delivering fluid at three pressures, a selector valve for controlling the delivery of fluid at normal and at high pressures shifted by said normal pressure when said booster is operated at normal pressure for delivering fluid at high pressure, said low pressure fluid shifting said selector valve to initial position for delivering fluid at normal pressure when said fluid at normal pressure which shifted the valve is cut off therefrom, a panel on said tank for supporting said booster and selector valve, a plurality of control valves on said panel actuated by fluid at low pressure for controlling the flow of normal fluid to the booster, the selector valve, to tank and to conduits which supply fluid to work-performing elements separate from the device, solenoid means for controlling the supply of fluid at low pressure to said control valves, and conduits interconnecting said valves, booster and pump and providing terminal ends for the delivery and return to tank of fluid under normal pressure and fluid under normal and at high pressures, and to deliver and return to tank fluid at low pressure.

18. In a self-contained power unit for delivering fluid at low and at high pressure, a tank containing said fluid, a motor, a pump operated by said motor for producing a flow of fluid at low pressure, a booster operated by said fluid for producing a flow of fluid at high pressure continuously as long as the booster is operated, a selector valve through which the fluid at low and high pressures is selectively delivered, means for shifting said valve to high pressure delivering position, and means for shifting said valve back to low pressure delivering position rendered effective when the high pressure in the valve has been relieved.

19. In a self-contained power unit for delivering fluid at low and at high pressure, a tank containing said fluid, a motor, a pump operated by said motor for producing a flow of fluid at low pressure, a booster operated by said fluid for producing a flow of fluid at high pressure continuously as long as the booster is operated, a selector valve through which the fluid at low and high pressures is selectively delivered, means for shifting said valve to high pressure delivering position before high pressure is delivered thereto, and means effective in the absence of said first means and after high pressure has been relieved from the valve to shift said valve back to low pressure delivering position.

20. A self-contained device for delivering fluid under a plurality of pressures including, in combination, a tank containing a fluid, a motor, a pair of pumps driven by said motor one for supplying fluid at normal pressure and the other for supplying fluid at low pressure, a booster for increasing the pressure of normal fluid to supply fluid at high pressure, a selector valve for selectively delivering fluid at normal and at high pressures, control valves for directing the flow of normal fluid through said selector valve to perform work, to return fluid to the tank, to direct fluid to the booster and to the selector valve for operating the latter to pass fluid at high pressure, and means for returning the selector valve to its initial position when the fluid under normal pressure which operated the selector valve is relieved therefrom.

OTTO MUELLER.

References Cited in the file of this patent

UNITED STATES PATENTS

| Number | Name | Date |
| --- | --- | --- |
| 1,333,660 | Hutchins | Mar. 16, 1920 |
| 1,451,303 | Mitchell | Apr. 10, 1933 |
| 2,058,377 | Francis | Oct. 20, 1936 |
| 2,088,859 | Huck | Aug. 3, 1937 |
| 2,218,565 | Vickers | Oct. 22, 1940 |
| 2,231,307 | Wallace | Feb. 11, 1941 |
| 2,347,301 | Twyman et al. | Apr. 25, 1944 |
| 2,355,669 | Moser | Aug. 15, 1944 |
| 2,366,388 | Crosby | Jan. 2, 1945 |
| 2,532,856 | Ray | Dec. 5, 1950 |